US009801020B2

(12) United States Patent
Scuba et al.

(10) Patent No.: US 9,801,020 B2
(45) Date of Patent: *Oct. 24, 2017

(54) SYSTEM FOR CREATING ANONYMOUS SOCIAL GATHERINGS

(71) Applicants: Jeffrey Scuba, Cardiff, CA (US); Gary Fernandes, Seattle, WA (US)

(72) Inventors: Jeffrey Scuba, Cardiff, CA (US); Gary Fernandes, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,228

(22) Filed: May 30, 2016

(65) Prior Publication Data
US 2016/0277895 A1 Sep. 22, 2016

Related U.S. Application Data

(63) Continuation of application No. 14/722,089, filed on May 26, 2015, now Pat. No. 9,357,350, which is a continuation of application No. 13/457,462, filed on Apr. 26, 2012, now Pat. No. 9,049,238.

(51) Int. Cl.
| G06F 15/16 | (2006.01) |
|---|---|
| H04W 4/02 | (2009.01) |
| H04L 29/08 | (2006.01) |
| G01C 21/00 | (2006.01) |
| H04W 4/20 | (2009.01) |
| H04W 12/02 | (2009.01) |
| H04L 12/24 | (2006.01) |
| H04L 29/06 | (2006.01) |

(52) U.S. Cl.
CPC ......... *H04W 4/023* (2013.01); *G01C 21/00* (2013.01); *H04L 41/0893* (2013.01); *H04L 63/0421* (2013.01); *H04L 67/18* (2013.01); *H04L 67/22* (2013.01); *H04W 4/206* (2013.01); *H04W 12/02* (2013.01)

(58) Field of Classification Search
CPC ...................................................... G01C 21/00
USPC ............................................................ 709/200
See application file for complete search history.

(56) References Cited

U.S. PATENT DOCUMENTS

| 6,968,179 B1* | 11/2005 | De Vries .................... 455/414.1 |
|---|---|---|
| 7,418,268 B1* | 8/2008 | Cabano et al. ............... 455/518 |
| 7,877,082 B2* | 1/2011 | Eagle et al. ................ 455/414.1 |
| 8,171,424 B1* | 5/2012 | Karam .......................... 715/810 |
| 2005/0250552 A1* | 11/2005 | Eagle et al. .................. 455/567 |
| 2006/0227047 A1* | 10/2006 | Rosenberg ............... 342/357.13 |
| 2007/0281689 A1* | 12/2007 | Altman et al. .............. 455/435.1 |
| 2008/0070593 A1* | 3/2008 | Altman et al. ............... 455/457 |
| 2009/0089321 A1* | 4/2009 | Yang et al. ................... 707/102 |
| 2009/0100037 A1* | 4/2009 | Scheibe ........................... 707/5 |

(Continued)

*Primary Examiner* — Hamza Algibhah
(74) *Attorney, Agent, or Firm* — Patrick M Dwyer

(57) ABSTRACT

A system for creating an anonymous social gathering of 3 or more persons. The system has a server digital device and a client digital device both operatively connected to a distributed network and thus to each other. The client device is configured to display an electronic mapping received from the server digital device through the distributed network and the electronic mapping displays at least one selectable geolocation indicator. Each geolocation indicator represents an indicated location of a gathering of at least two anonymous portable digital devices. The electronic mapping is configured to display indicator identification information on the user device for the momentarily selected indicator.

7 Claims, 13 Drawing Sheets

(56) References Cited

U.S. PATENT DOCUMENTS

| | | | |
|---|---|---|---|
| 2009/0125230 A1* | 5/2009 | Sullivan | 701/207 |
| 2009/0254840 A1* | 10/2009 | Churchill et al. | 715/753 |
| 2009/0281719 A1* | 11/2009 | Jakobson | 701/201 |
| 2010/0180009 A1* | 7/2010 | Callahan | 709/217 |
| 2010/0205242 A1* | 8/2010 | Marchioro et al. | 709/203 |
| 2010/0255856 A1* | 10/2010 | Kansal et al. | 455/456.1 |
| 2010/0317392 A1* | 12/2010 | Davis et al. | |
| 2011/0041084 A1* | 2/2011 | Karam | 715/753 |
| 2011/0072034 A1* | 3/2011 | Sly et al. | 707/769 |
| 2012/0324027 A1* | 12/2012 | Vaynblat et al. | 709/206 |
| 2013/0100017 A1* | 4/2013 | Papakipos et al. | 345/158 |
| 2013/0184011 A1* | 7/2013 | Kaushansky | 455/456.3 |
| 2013/0185355 A1* | 7/2013 | Tseng et al. | 709/204 |
| 2013/0218983 A1* | 8/2013 | Richard | 709/206 |
| 2013/0316735 A1* | 11/2013 | Li et al. | 455/456.3 |
| 2014/0156746 A1* | 6/2014 | Wheatley | 709/204 |

\* cited by examiner ns, real-time check-ins, profile matching, profile scraping
SYSTEM FOR CREATING ANONYMOUS SOCIAL GATHERINGS This application claims priority to U.S. patent application Ser. No. 14/722,089 filed May 26, 2015 which is a Continuation of U.S. patent application Ser. No. 13/457,462 filed Apr. 26, 2012 now issued as U.S. Pat. No. 9,049,238 on Jun. 2, 2015 and which claimed priority to U.S. Provisional Application 61/517,787 filed Apr. 26, 2011, and U.S. Provisional Application 61/497,949 filed Jun. 16, 2011.

TECHNICAL FIELD

This disclosure relates to the creation of anonymous social gatherings of communities of interest; more particularly it relates to using real-time and historical mapping of community gatherings to effect present real-time social gatherings.

BACKGROUND

There is a distinct need for human connection on the planet. Many people who are part of the same community often do not know each other. For example, a fine art painter in Seattle may not know but would like to know where other fine art painters in his community are gathering nearby to meet new people, see old friends, and connect with his community. It is often unknown to people who are part of relatively obscure communities where to get connected with people in their community. For example, there is a relatively obscure community of philatelists. They may have a website to connect online. People in the philatelic community, for example, might like to see where other philatelists have gathered historically or are gathering in real-time to connect with and support one another in person. There are millions of obscure communities it the world that are difficult to find. Furthermore, even mainstream communities become effectively obscure to a traveler to new locations. When the fine art painter from Seattle travels to Chicago, that fine art painter may not know where his community gathers in Chicago, but would love, to be instantly related with his community in the new city.

Conventional social interaction systems, including check-ins, real-time check-ins, profile matching, profile scraping and matching, created situations, location history, friends and family locations, check-in consolidation, heat mapping locations, and real locations pulled into games, are all designed with the individual at the center. The individual is the key element.

But what if the individual were not the key element? Not in the design. Not in life. Not at all.

To get an experience of this consider two different perspectives, in one, I am here (wherever that happens to be) as an individual. There are people here with me. Maybe I'm 'in here' and they're 'out there'. Or I and they are all 'out there' in the world together. There's the world, and there are people in it. I am one of them. This is the typical individual based perspective that roots many of our social systems.

In another perspective I am here (wherever I happen to be) as family (the Mom, Dad, siblings, spouse kind of family—the blood is thicker than water family). "I" is different in this case, "I" is family. Not an individual. Not a representative of family. Not a component of family. Not a family member. Not an individual at all. An entity or consciousness in itself. I am here and I am Family. In a like manner, consider the same perspective but substitute community for family.

Here is what is happening 'out there' now (according to Google search on "depression rates");

Depression is a chronic illness that exacts a significant toll on America's health and productivity. It affects more than 21 million American children and adults annually and is the leading cause of disability in the United States for individuals ages 15 to 44.

Lost productive time among U.S. workers due to depression is estimated to be in excess of $31 billion per year. Depression frequently co-occurs with a variety of medical illnesses such as heart disease, cancer, and chronic pain and is associated with poorer health status and prognosis. It is also the principal cause of the 30,000 suicides in the U.S. each year, in 2004, suicide was the 11th leading cause of death in the United States, third among individuals 15-24.

There is a distinct need for real human connection on the planet. When we feel heard, known, understood, and gotten, a tangible energy is available that sustains and nourishes us. Happiness is available. Life is rich and varied but always more fun with people we care about.

DISCLOSURE

This disclosure meets some or all of the needs summarized above.

Overview.

The disclosed system may be thought of as including any discovery, design, modification, development, improvement, or method or any other technological advance relating to any system for creating, joining or generating anonymous social gatherings that has an application that can be installed, loaded or otherwise used on various portable geo-locating devices such as smartphones, tablet computers, or laptops, and that has a backend server system, and a web server or their cloud equivalent.

The disclosed system is a location-based social network for catalyzing human connection. The system uses geolocation technology on smartphones and the like to make gathering with your people in person easy and fun—even if you have never met them. The system optionally provides public recognition and monetary rewards for participating. The system features super low friction startup. No personally identifiable information needed.

With the system one can see community gatherings on a map, invite a community to gather at community flash mobs, play with people and get public recognition and monetary rewards. The system saves money with optional discounted dynamically valued coupons from advertisers and themed community gatherings for venues (e.g., custom music playlists, logistics requests). Optional in-person social gaming platform is intended to keep interactions light, fun, and easy. Open development platform allows developers to contribute games.

System users can include travelers looking for locals, recent transplants exploring their new city, business people wanting to network, social people looking for new friends, single people looking for relationships, obscure people looking for commonality, sports game organizers wanting to play, party organizers creating soirées and just plain social serendipity seekers.

Location awareness, history tracking:, archiving, profiles, heat maps, proximity detection, location advertising and invitations are not new. What is new is that all those are only being used now with the individual at the center. What is disclosed, among other things, is using them with community at the center. There are two places in the disclosed system where the individual is considered. The individual is in those two places because (1) the organization of our bodies into separate physical entities and (2) the organization of our financial system around the individual.

Creating a Gathering.

The disclosed system, sometimes herein referred to as a System for Human Discovery, addresses the question: where are your people and how do you connect with them in person? The intention of the disclosed system is to connect people with their communities, wherever they are and whatever they happen to be, such that all human beings wake up each morning ecstatic that they get to go out into the world and be with their people.

The system advantageously uses geo-location and or proximity sensing technology and the like now known or later developed. This technology is found on many smartphones and other devices and is employed to determine if a quorum of at least 3 community members has gathered together. (In some embodiments, it only takes 2 members—herein referred to as a ghost gathering—to be detected. When a ghost gathering is joined by yet a third community member, it becomes a three device or three person quorum.) This unique grouping appears on a map in real-time such that others in the community can see the gathering happening and join in person. It is also possible to generate a gathering invitation for a specific time and location where a quorum is not necessarily present such that others can see it and come to that location and connect.

Historical community gathering information is also available to enable a spontaneous gathering to occur that is not necessarily on the map yet. Where and when the community has historically gathered is a likely opportunity for repeat gatherings to happen.

The disclosed system includes a software application that can be installed on various portable geo-locating devices. In this disclosure, the term "installed on" is used interchangeably with "run on" "loaded on" or "used on" or the like terminology so that, with HTML5 and web apps and the like, it is not necessary to install anything per se. Also "software application" is used interchangeably with application and or software system, and in some instances may be comprised of a web page.

The disclosed app or application may simply and advantageously be loaded in a browser and then used. The disclosed system and methods also advantageously employ a conventional backend server system and a web server, though it is also contemplated to use various configurations of so-called cloud computing now known or later developed in addition to or instead of conventional server systems.

The system reports the location of a particular user to the backend servers. Based on location data from many users, software on the servers determines if enough community members have gathered together to form a quorum, for example a group of three or more community members in a particular location. If a quorum has gathered, a marker indicating the gathering is placed on a widely available community map. The map is conventionally available to community members through the software application on the portable geo-locating device or through any web browser.

Its not necessary to use a map in a strict or conventional sense to implement the system. The system alternatively creates a list of gatherings, and the user pans up and down the list to select a gathering, then optionally uses a map to get there. A list item in such a list has all the same information that the dot (or other marker) on the map has, size, change in size, community association, anonymous RSVP count, etc. and also advantageously has distance from user and direction and an address or latitude and longitude coordinates to locate it.

Once a quorum has formed, metrics measuring the gathering's intensity are monitored, and the indicator or marker on the map (if there is a map) is updated using visual and other clues to indicate its current intensity. (If the mapping is by list instead of my map, the indicator data In the listing are updated in like manner.) Intensity is calculated based on gathering size, increase or decrease in size, rate of increase or decrease in size, and the social experience (described below) of the users that have gathered.

"Indicator, or marker, on the map" generally means one marker or dot per gathering. An alternate visualization is a "heat map" view without distinct gathering indicators—i.e., a blended view of gatherings in an area, in a graphical representation of data where individual values contained in a data matrix are represented as colors or shades of color.

To start, a user installs the appropriate software application on their portable geo-locating device, and starts the application. When the software application starts, it creates an identifier that uniquely identifies the device and sends the identifier to a server that stores it in a database. No other user information needs to be provided to use the disclosed system although, optionally, a user may provide additional information to purchase products (described below).

The user then indicates their membership in one or more communities. Communities may be public or private. A public community is one that is available to any user to join. A private community is one that requires an invitation from a current member and optionally, approval, from a moderator or a group of moderators to join. A user may also create their own public or private community by using the software application to dynamically generate an invitation to nearby users to join what amounts to an community of users in adventitious proximity. Public or private communities may similarly be formed for any other reason, or no reasons at all. Private communities may not be visible to all users of the system.

It is contemplated that gatherings can be quite large, for example a rally on the DC mall with a million people or a stadium concert for famous musician. Two gathering metrics, user density and proximity measurement, can potentially cover a very large area when a large gathering happens. To employ proximity measurement, the user devices have to be close enough to proximity detect each other, it is believed that conventional bluetooth technology has a detection range of about 10 m. (It is also contemplated to use the maximum effective bluetooth range as a range specification for gathering metrics, whatever it may now be or later be developed to be. In addition, alternate energy spectra can be used for detection, either now known or later developed.) There could be 10,000,000 devices/people, all less than 10 m apart covering a vast area, and that is still a gathering as specified in this disclosure.

Once the user ha joined or created one or more communities, the software application then notifies the user when community quorums occur within a user defined radius of the user's current location (radius of discovery). Users may also browse the community map with the software application or their web browser to locate quorums that are not within their radius of discovery.

Community members may also generate invitations to gather that appear on the community map. Other users in the community receive notification that a new invitation was generated, and can see the new invitation on the map. They are then free to meet their community at the specified time and place. The user generating the invitation may use the current time to create spontaneous or dynamic new communities and gatherings.

Here is another distinction between community vs. individual in the disclosed system. When a user is invited to a newly formed community, it is not the user being notified except in passing, it is the whole community (of which the individual is a part) that is being notified of the new community, with it's possible mesh with or similarity to an existing community in which the individual is already a member.

A community suggestion or invitation to a user is based upon a perceived or suspected overlap of community interest, not a match to an individual's stated interests. Overlap evaluations can include such criteria as present location, gathering history or community home base.

In one advantageous leader/follower use scenario, a leader or group of leaders of a community may be designated. The designated leader or leaders then generate invitations to the community. In this scenario other community members are prevented from generating gathering invitations. A leader/follower model is useful in situations where a significant political figure, lecturer, musician or other public figure has a following and invites their community to an rally event or concert.

It may optionally be determined in advance to designate for a gathering location a "secret spot" that only the community knows about. For instance "meet at the spot" without a latitude, longitude or address designation. It will serve as an additional layer of anonymity. Advantageously, there are no public/private invites in the system. A community may be either public or private but any invitations always go to the whole community.

Historical community gathering information is also available to community members. The historical information is provided to allow people in a particular community to know where their community has gathered historically to create the potential for spontaneous community gatherings. Historical information is available through the application on the portable geo-locating device or through the web.

As an example, a painter, who is part of the fine art community in Seattle, installs the disclosed system software application on his portable geo-locating device and indicates that he is part of the fine art community. The application transmits current location information for the painter's device to the backend server system which then calculates the painter's proximity to other users in the fine art community. When the painter is within a user defined distance of a fine art community quorum the painter is notified of the location of the quorum on his portable geo-locating device. The painter is then free to join the quorum in person if he chooses.

The painter may also generate an invitation to the fine art community to gather at an art gallery, for example, using the software application on his portable geo-locating device or the community map website. He specifies the gathering location and time. He can use the current time to create spontaneous gatherings. Other fine art community members are notified of the gathering and can then see the invitation on the community map through the software application on their portable geolocating devices or through the community map website and join the gathering in person.

The painter may also do some research using information about the historical gatherings of the fine art community using the software application on his portable geo-locating device or a web browser to discover where the fine art community may potentially show up. The painter can then go to those locations to potentially meet people in the community or discover locations of interest or resources for that community.

Should the painter be traveling from his home town of Seattle to Chicago, for example, he can check the fine art community historical gathering information in Chicago for likely community gathering locations. The painter can then visit those locations on his trip, increasing his chances of connecting with other fine artists and potentially discovering places of interest for fine artists in Chicago. When the painter has arrived in Chicago, he can then use the system to determine where the fine art community is gathering in real-time nearby and then go to those locations to be with his community, Usage Catalyst System.

The system advantageously includes a usage catalyst system. The usage catalyst system rewards users and advertisers for participating in the system. Rewards include monetary rewards and public acknowledgment.

In the system, a user acquires social points and a user's social points are a measurement of a user's experience using the system, like social street credit. Users get social points by gathering in a quorum with any of their communities. Social points can be collected by unverified users. An unverified user is a user who has not been verified as being in possession of their device. It is possible that an unverified user's device is in the possession of another individual.

A user also acquires consumer points and a user's consumer points are a measurement of a user's fiscal impact on advertisers. Users get consumer points by purchasing product from any advertiser. Consumer points can only be collected by verified users. A verified user is a user who has been verified to be in possession of their device. Verification is achieved using a password, fingerprint, voice recognition, or through some other means of user verification.

Communities also get social and consumer points as a function of the social and consumer points gotten by members of the community while gathered in a quorum with other members of that community.

As users and communities get social points they achieve levels of social power and are recognized publicly with social rankings. This social power ranking system can be considered similar to other experience ranking systems such as the karate belt system or even systems measuring character experience levels in a role playing video game.

Advertisers may provide advertising to specific user communities. Advertisers receive suggestions for communities to target based on which communities have historically gathered nearby or gathered at businesses in the same business category as the advertiser. An advertiser may then create a coupon deal such as ten dollars of product for five dollars. The advertiser may then invite specific communities to come to one of advertiser's commercial location or to some specified other location to purchase the coupon deal.

Users receive available coupon deals in their available deals inbox on their device. Users may only purchase the coupon deal when a quorum, three or more individuals, in their community has gathered at the advertiser's location or some advertiser specified location. Users may purchase some number of coupons up to an advertiser specified maximum. The coupons may be used at the time of purchase or at some future date. Only verified users may purchase coupons.

In addition to the user and community points described above, community gatherings themselves receive social and consumer points as the gatherings progress. As stated previously, a community gathering is a quorum of three or more users from a particular community that are proximately located. A gathering's social points are calculated based on the gathering's size and the social experience of the users that have gathered. A gathering's consumer points are calculated based on the gathering's fiscal contribution to the advertiser and include measurements such as the number of coupons bought by users at the gathering and the total amount spent on coupons by users at the gathering among potentially other measurements of fiscal impact.

Advertisers also get social points. Advertiser's social points are associated with specific communities and are based on the contribution that they have made to those communities. Advertiser social points are a function of the social points of the community gatherings that occur at the advertiser's location. Advertisers are also recognized publicly for their contribution to those communities using a ranking system similar to the ones used to recognize users and communities.

Coupon price is dynamically calculated based on the consumer points of the user that is purchasing the coupon, the consumer points of the gathering that the user has joined to allow them to purchase the coupon, and the consumer points of the community associated with the gathering. The gathering's consumer points indicate the fiscal impact that the gathering is having on the advertiser at the current moment, while user and community consumer points indicate a historical fiscal impact on advertisers not necessarily affiliated with the current gathering or advertiser. The gathering's consumer points are more heavily weighted than user or community consumer points in the coupon price calculation. The price of the coupon decreases as the amount of user, gathering, and community consumer points increases. There is as minimum allowed coupon price. The dynamically calculated coupon price will not drop below that price. If that minimum price is attained by a user, that user is recognized for their achievement.

Users are charged for any coupons they purchase while at the gathering at the time they leave the gathering. The coupon price that the user pays is the minimum calculated coupon price while the user was connected to the gathering. It is possible that a user will buy a coupon at one price and be charged less than that price when they leave the gathering if the gathering's consumer points increase while the user is part oh the gathering. Users' purchased coupons are advantageously, but not necessarily, stored in an active coupon inbox within the software system on their device.

An advertiser may also create a coupon deal that is targeted to any community that happens to be gathering nearby. The advertiser's coupon deal is placed in an advertising queue. When a user invites their community to gather near the advertiser's location, but not necessarily at the advertiser's location, the user is alerted to the available nearby coupon deal and is encouraged to gather their community at the advertiser's location instead of wherever they originally intended to gather their community.

Themed Gatherings.

The system advantageously includes customizable themes for community gatherings. Community members may associate themes with their gatherings. A theme is any community specific gathering customization. For example, members of a community may associate music with their community. When the community gathers, the community's playlist is available to play for the use who have gathered. Other themeable aspects include gathering logistics requests like particular furniture or arrangements of furniture or a clear floor for dancing, or particular digital art displays to be displayed on TVs and other digital displays that are so common in establishments today.

A community may choose to have statistics regarding the gathering displayed on a digital display such the size, intensity, or social points of the gathering. Community themes are available to advertisers who may choose to implement the themes before the gathering happens to welcome and encourage the community gathering.

Social Gaming Platform.

The system also advantageously includes a social gaming platform for proximately located users. The social gaming platform allows users who have gathered together in person to play games together. Games created for the system social gaming platform are required to be playable by two or more proximately located users on portable geo-locating devices.

For example, the context of a community gathering could be a fund raiser for a non-profit. An example of a social game in this context could be a raffle game for randomly selecting winners of a fund raising raffle. Other games could include ice breaker games that keep the interactions light, fun, and easy. For example, a paired social game in the spirit of Simon Says where one user taps out a sequence that another user matches. Other examples include in person card pules such as bridge or poker. An example of a holiday themed social game is a game where each guest brings a present to the gathering and the in person social game selects users at random to pick a present and then eliminates them from future selections until everyone has selected a present.

The social gaming platform for proximately located users is a platform that is open for contributions from out side developers. Outside developers may write custom games that are available for one or more communities or all communities, Example Systems and Methods Disclosed.

A method for creating an anonymous social gathering is disclosed. It is anonymous because no user personal information was used in setting up the gathering. However it should be noted that mere inclusion of personal data or individual identifying data in a competing system to avoid the claims presented in this case is still intended to fall within the scope of the appended claims. In the method there is displaying on an anonymous user's digital device an electronic mapping, and the mapping includes at least one geolocation indicator. Each geolocation indicator desirably represents an indicated location, with a location size or area roughly having a radius of between about 10 and about 100 meters. For a gathering to be displayed it mast have at least two anonymous portable digital devices.

Also in the mapping, and generally in conjunction with the geolocation indicator, is display of indicator identification information on the user device for any particular selected indicator. In the system no user identifying information is ever asked for or stored. The indicator identification information therefore doe not include any personal user data for any of the portable devices represented by the indicator. The indicator identification information displayed can be any or all of the following: a community association for the indicator, a number for the number of devices represented by the indicator, an intensity rating for the gathering of devices, a geocoded nearest address, an invitation identification and an anonymous RSVP count.

When the user moves to the indicated location of the selected indicator she is creating the anonymous social gathering, such that the anonymous social gathering is comprised of 3 or more persons and their devices.

The electronic mapping referred to above can include any or all of the following: a conventional electronically displayed map (like a Google map) with a dot or other shape dynamic location indicator as the geolocation indicator or a scrollable list that has a listing of at least one set of latitude and longitude coordinate items as the geolocation indicator, a listing of at least one geocoded address item as the geolocation indicator, or a listing of at least one location name item as the geolocation indicator. Where a list is what makes up the mapping, the listing is advantageously ordered or sorted based on distance from the user device or on distance from a user selected location. For instance, a user may desire to search for a gathering that is within a quarter mile of Seattle Center, rather than from her current location.

An additional contemplated part of the disclosed method is providing driving directions to the indicated location of the selected indicator, in any manner now known or later developed, such as displaying the driving directions at least in part on a conventional electronic map.

For any selected listing item the indicator identification information further optionally includes gathering size (device population or area covered), change in gathering size, name of registered community association for the gathering and distance from the user device. The indicator identification information can also have a community statistics summary that is tied to a catalyst points system, the primary geographic location of a selected community or the number of people who have joined a selected community.

A method for joining an anonymous gathering of a mingle community of interest is disclosed. A community of interest is a community of people with a common interest, such as the Seattle Sounders, or fly fishing, or high fashion, Italian desert restaurants in Seattle. The possibilities for such communities are limited only by human imagination. A mingle community (or mingle community of interest) is a community of persons who have anonymously registered with an embodiment of the disclosed system and who have selected at least one new or pre-existing community also registered with the embodiment of the disclosed system (for instance Cohesion Software Inc.'s own MingleMoment™ system).

This method includes storing in machine readable memory a plurality of names of mingle communities of interest, each community having a plurality of anonymous registered members each owning a portable digital device that is adapted for calculating and sending a location data input from the digital device over a distributed network.

It also includes using at least a first hardware processor operatively associated with the machine readable memory programed to assemble a listing of the communities and to create a data association between the names of respective members of the respective communities to create a registry of mingle communities of interest and store it in the memory. Responsive to respective location data inputs received over the network from the digital devices of the plurality of anonymous members, using a second hardware processor operatively associated with the machine readable memory programed to calculate and store in memory a location of a gathering of at least two of the anonymous portable digital devices that are proximate to each other.

In this disclosure reference to any hardware processor is intended to include use of a single processor (even though first and second etc. processors are expressly called out) for all disclosed and or necessary processing functions, or an asynchronously operating array of processors operatively coupled to each other and to the machine readable memory and to various input and output devices as needed. Similarly reference to or discussion of machine readable memory is intended to encompass a single memory unit or chip or disk etc. or a coordinated array of memory, or any number of disparate memory units. All memory and all processors in any form now known or later developed, and all whether ground based or cloud based, are contemplated.

Also, responsive to a location data input from a digital device of an anonymous user, the method includes displaying on the digital device at least a portion of the registry of mingle communities, where at least on at the communities listed has a gathering location that is within a user selectable distance from the anonymous user or from a user selected alternate location.

Further, responsive to a selection data input from the digital device of the anonymous user, the method includes causing the digital device of the anonymous user to display an electronic mapping, the mapping comprising at least one geolocation indicator representing the location of the gathering of the at least two anonymous portable digital devices.

An alternate method for joining an anonymous gathering of a mingle community of interest is also disclosed. The method includes displaying on a digital device of an anonymous user a listing of registered mingle communities that have proximate gatherings of at least two anonymous portable digital devices. The users of the portable devices are anonymous members of the respective mingle community, and the respective gatherings are located within a user selectable distance. The distance is measured either from the user device or from a user selected alternate location. The method further includes at least momentarily selecting a listed community (such as by mouse-over or the like user action. Upon selection or temporary selection, the method includes displaying on the user device an electronic mapping, and the mapping displays at least one geolocation indicator representing the location or a respective gathering associated with the selected community of interest.

A system for creating an anonymous social gathering of 3 or more persons is disclosed. The system has a server digital device operatively connected to a distributed network and at least one client digital device operatively connected to the distributed network. It should be noted that the terms server and client are not intended to limit the scope of the appended claims to classic server/client systems. In fact, the contemplated client devices may not be operating any 'client software' in the conventional sense at all.

The disclosed system expressly does not specify any back and forth between client and server. The system is left open for cloud based service implementations and possibly other networked but non-client/server implementations. So the word 'server' does not imply one or more fixed servers sitting in an air conditioned machine room. With cloud based implementations, one may not even know where the data is actually coming from—like a giant distributed virtual server.

Each device is configured to display an electronic mapping received from the server digital device through the distributed network, and the electronic mapping displays at least one geolocation indicator (see expanded discussion of this topic above). Each geolocation indicator represents an indicated location of a gathering of a plurality of anonymous portable digital devices, with each such device not more than about 10 m from at least one other such device in the gathering (the 10 m figure is derived from what is believed to be the current effective range of bluetooth technology, and is intended to embody this maximum effective range—unless set to as lower a figure by user selection—no matter the energy spectrum selected or the state of improvement in that energy spectrum and whether now known or later developed).

In the method the electronic mapping is adapted for a user to select a geolocation indicator, temporarily as in mouse-over or the like, or more permanently as with a left mouse click or finger tap. When indicator selection occurs, the electronic mapping is further configured to display indicator identification information on the user device which by way of example and not of limitation can include a mingle community association for the indicator, a number for the number of devices represented by the indicator, an intensity rating for the gathering of devices, a geocoded nearest address, an invitation identification or an anonymous RSVP count, or a combination of any or all of these.

In the system the electronic mapping is selectable from at least the following: an electronically displayed map, a listing of at least one set of latitude and longitude coordinate item, a listing of at least one geocoded address item, a listing of at least one location name item and any combination of such listing items. (See parallel discussion above for a method of using the disclosed system.)

System geolocation indicators are desirably adapted to display a location based upon a location technology or a proximity sensing technology or a combination of both. For example, the location technology employed, can be a GPS technology or other satellite location technology, and the proximity sensing technology can be a bluetooth technology.

The system optionally includes in the mapping display of indicators special visuals for size, growth, experience of the gathering, and density of the gathering, as well as special visuals for intensity of the gathering where intensity is advantageously a measure of size, and or increase or decrease of size, over time. An additional visual in the map display of indicators is a shadow indicator of a historical gathering or a shadow indicator of a ghost (only two devices) gathering.

The system desirably includes invitations in the mapping display, including invitations from a community member inviting her community to gather, a leader inviting her community to gather, a user inviting nearby users to participate in dynamic community creation, a two person ghost gathering inviting their community to gather as part of a paired cheek-in or paired invitation, and or a community inviting another community to gather with them or join them at an existing gathering. A related invitation, introducing the element of invitation intensity, is a gathering of more than two people (2 or more people) inviting their own community to gather. Invitation intensity in this context is measured by the number of people who, acting either in concert, or separately or individually, but within a limited time frame, who all invite the same community to join in on their gathering. For example, a gathering of 4 stamp collectors agree and act in concert to all send out the cheek-in type invitation. This is a more intense invitation than a similar invitation from two people. But not as intense perhaps as several smaller groupings in a gathering all sending out a cheek-in invitation or even a plain invitation for their community to gather and their numbers totaling 10!

The system employs a set of notifications, desirably in the mapping display. Some notifications are for when a selected community gathers nearby, or when a user joins a gathering in person, they are also notified that they have in fact joined the gathering, since it is the system that monitors formation and maintenance and locations of gatherings and all other functions are essentially anonymous. Thus a user could walk into park and unexpectedly find (via mark marker or other indicator or notification on her phone that she has walked into a pre-selected proximity for a gathering of fellow community members already in progress, but perhaps none of whom she recognizes by sight. And it should be born in mind that, depending on the device proximity range setting for system or user for proximity of devices to constitute and maintain a gathering, it is possible in a outdoor setting or indoors in small rooms for none of the gathering to be in sight of each other!

It should also be noted that this proximity setting is sometimes referred to herein as a merge limit. This is different from another setting:that can be thought of as proximity too. It is discussed above that a user can select, as a limit or range on what she is willing to be shown or notified about or invited to, a distance from her location or a distance from an identifiable reference point that also selectable by her. This is a different sense of proximity or what is 'nearby'.

Other notifications are for when a user is invited to join a gathering. In some cases, what distance is considered 'nearby' is selectable by the user depending on how wide a net the user wants to cast. To further specify the criteria for desired notification, additional gathering qualities such as size (population), change in size, rate of change of size, may be specified. For example, "I only want to be notified when 10 or more people have gathered or the gathering is growing at least 20% every 10 minutes."

The system defines a special gathering of the plurality of anonymous portable digital devices when the gathering contains only two device, and the devices have initiated a paired check-in. This user-initiated paired cheek-in is the concerted and intentional action of the two community members in the ghost gathering using their devices to invite the rest of their community to gather with them. Any other two device gathering is merely a ghost or opportunity for a third device to join and form a gathering and the system can selectably either display such ghosts or not. Any ghost gathering could be thought of as an implicit paired check-in, but it's not a "user initiated paired cheek-in."

In general, a system and methods for creating anonymous social gatherings of communities of interest area disclosed. The system uses portable and relatively stationary digital devices that operatively connected to a distributed network and thus to each other. A client device is configured to display an electronic mapping received from the server digital device through the distributed network and the electronic mapping displays at least one selectable geolocation indicator. Each geolocation indicator represents an indicated location of a gathering of at least two anonymous portable digital devices. The electronic mapping is configured to display indicator identification information on the user device for the momentarily selected indicator.

An alternate embodiment of the disclosed system is a system for managing anonymous gatherings of mingle communities of interest. This system has generally at least the following databases: user database, communities database, gatherings database; all of which maintain anonymity for users by neither seeking nor storing any personal user data or user identification data.

As databases in current technology are a morphing target, it is to be noted that database in this disclosure does not imply only as fixed group of computers running a relational database. A lot of companies aren't using relational databases anymore. A database maybe any implementation, now known or later developed, as will be appreciated by those skilled in the art that receives, manages and stores data in a way that data retrieval can be programmed and effected, whether based on the ground; or in the 'cloud'. This includes emerging concepts of a data store or the like.

The recitation of three (or more) databases in a claim is not intended to require three separate and distinct databases or tables or data stores; in fact the database requirement can be met in some cases by a large multi-functional database or a distributed database that is adapted to function as if it were separate databases, say for users, communities, gatherings and the like.

Likewise storage means any kind of conventional memory storage, but also means emerging concepts for data storage including cloud distributed storage, whether now known or later developed.

There are also a plurality of anonymous portable digital devices each further comprising at least one geolocation/proximity device and a user interface application adapted to send, receive and display proximity/location data on a device screen.

There is a server and a server application, the server application further comprising a gathering engine adapted to at least send, receive, and store proximity/location data associated with the respective anonymous portable digital devices, and further adapted to process and match incoming relative locations and proximities with data from at least one of the databases. The server is operatively connected to the databases and to a distributed network, and via network to respective portable digital devices, and the server application receives incoming relative proximities and other data and requests from the plurality of digital devices asynchronously and sends proximity/location data and gathering and community identification data to the plurality of digital devices (in some cases via an optional web server).

A used device displays an electronic mapping from the server and or the web server and the mapping displays at least one geolocation indicator, where each geolocation indicator represents a location, covering an area having a radius of between 10 and 100 meters, of a gathering of at least two anonymous portable digital devices. The mapping display and the displayed geolocation indicators do not include any personal user data for any of the portable devices represented by the indicator and the indicators are adapted for further display of indicator identification information for a selected indicator. The indicator identification information displayed can optionally include any or all of a mingle community association for the indicator, a number for the number of devices represented by the indicator, an intensity rating for the gathering of devices, a geocoded nearest address, an invitation identification and an anonymous RSVP count.

An alternate method included in the disclosed system, is for facilitating anonymous in-person meeting. The method includes receiving by a client from a server an electronic map display, the map displaying at least one geolocation indicator, where each geolocation indicator represents a location, covering an area having a radius of between 10 and 100 meters, of a gathering of at least two anonymous portable digital devices; sending by the client to the server indicator identification information for a selected indicator from within the map display; receiving by the client from the server anonymous indicator identification information for the selected indicator from within the map display, the information being displayed within the map display. The geolocation indicator information can include any or all of a mingle community association for the indicator, a number for the number of devices represented by the indicator, an intensity rating for the gathering of devices, a geocoded nearest address, an invitation identification and an anonymous RSVP count.

Sending data back and forth between client and server need not occur in the sequence recited, and may also be either asynchronous or pre- or post-delivered. It is contemplated for an app to cache data, such as, but no limited to an HTML5 app without a network connection using cached data. So the disclosed back and forth between client-server is not necessary to use the disclosed system. For another example, a client device requests the whole data bundle for a region, including indicator information, and works with it locally, never requesting anything else. In this example there would be fully functional dots and other indicators on the map or list exactly as intended and as otherwise disclosed herein.

An alternate method included in the disclosed system is also for facilitating an in-person meeting. The method includes sending by a server to a client an electronic map display, the map displaying at least one geolocation indicator, where each geolocation indicator represents a location, covering an area having as radius of between 10 and 100 meters, of a gathering of at least two anonymous portable digital devices; receiving by the server from the client a selection of a geolocation indicator within the map display; sending by the server to the client anonymous indicator identification information for the selected indicator from within the map display, the information being displayed within the map display. The geolocation indicator information can include any or all of a mingle community association for the indicator, a number for the number of devices represented by the indicator, an intensity rating for the gathering of devices, a geocoded nearest address, an invitation identification and an anonymous RSVP count.

BEST MODE

Figure 1:
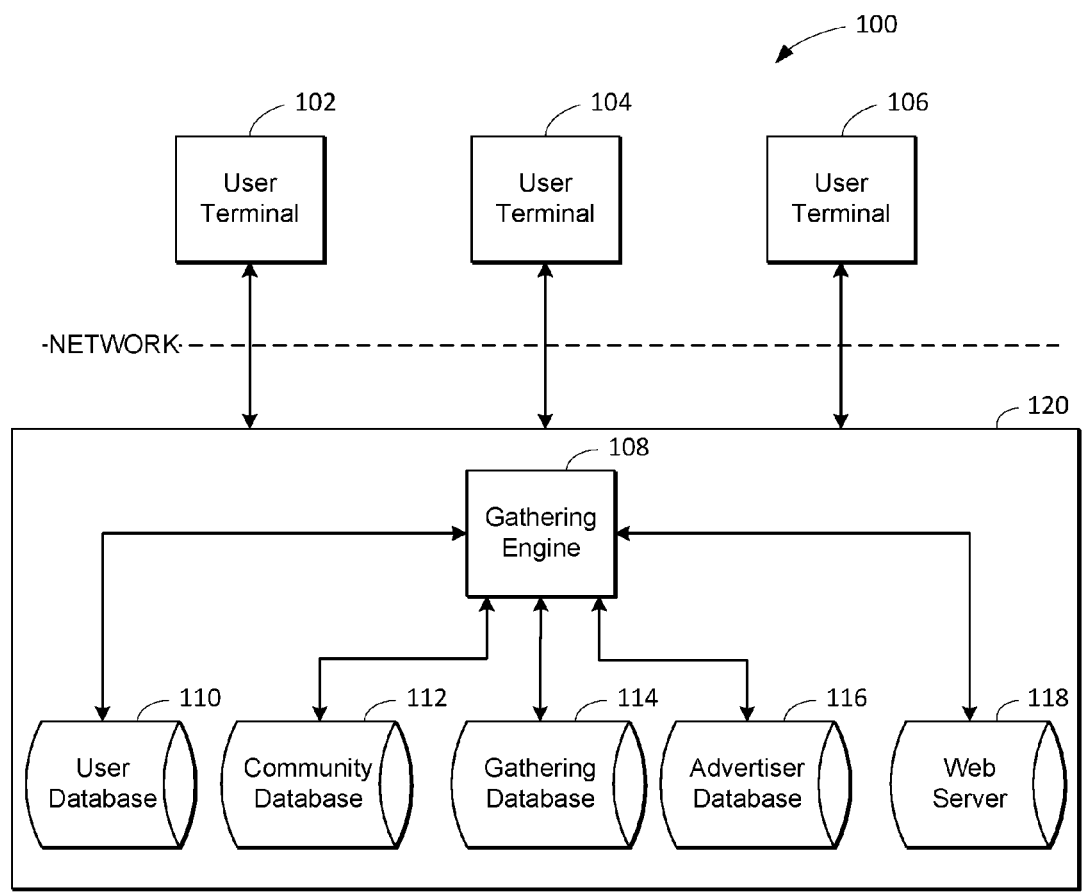
FIG. 1 is a system diagram view of an aspect of the disclosure.

Definitions.
Proximity Detection.

In some applications of the disclosed system, it is desirable to detect proximity between portable anonymous digital devices. This may advantageously be accomplished by using the conventionally supplied bluetooth capabilities of such conventional devices, in a manner which it is believed will be well known to those skilled in the art.

Proximity, as used in this disclosure includes both absolute proximity and relative proximity. Absolute proximity is either present or not for any given pair of devices. If the two devices are within range of one another for the selected energy spectra technology maximum effective range, they are proximate, in this absolute sense, and are considered part of the respective gathering, assuming respective community associations meet selection criteria. Absolute proximity thus helps determine the overall size of the gathering.

Relative proximity is a measure of how close any give pair of devices are to each other, within that maximum effective range of detection. The closer the two devices are to each other, the greater the relative proximity to each other. In turn, detection and processing of these relative proximities can advantageously be used, in a manner believed to be known to these skilled in the art, to calculate a relative density for the gathering comprised of all proximate devices. Maximum distance for devices to be considered proximate (either relative or absolute), within the maximum effective range of detection, can also be selectively set within the system, and selectively set by any given user seeking a 'nearby' gathering to join, where the user determines what is to be considered 'nearby'.

It is believed that conventional bluetooth technology has a detection range of about 10 m. In some embodiments the maximum effective bluetooth range is used as a range specification for gathering metrics, whatever that may now be, or later be developed to be. In addition, alternate energy spectra can optionally be used for proximity detection, whether now known or later developed.

Bluetooth also enables, in the relatively shorter ranges, more precise device clustering for tighter clusters and better locatability (i.e., more location data points from an established device cluster). There could also be anonymous clusters where a reporting device is selected and reports information about the gathering. This could also be done with conventional WIFI meshnet. Also, a localized ad hoc data network could also be done with a WIFI meshnet, enabling anonymous communication between portable devices with no outside data network (Internet) involved.

Dynamic Community Creation.

Scenario: A group of people has gathered who are not yet part of the same community. One of them decides to create a new community with the people who are there gathered, and she initiates that process dynamically, creating the new community of potentially all those gathered in a selected range. Those gathered can then accept or decline the invitation to join the new community.

Distributed Network and Public Network.

A distributed network, or the alternate and slightly different phrase a public network, is intended to mean and to include any known way of conveying information between systems and persons, either now known or later developed. It includes, but is not limited to, the Internet, the World Wide Web, any cell phone network or data network, any WIFI network or the like, whether wired or wireless.

Operatively Connected.

For the purposes of this disclosure "operatively coupled" and "operatively connected" are two phrases intended to be interchangeable, each phrase intended to refer to a communicative linkage between respective parts of an apparatus or system such that the parts are able to interact, interoperate with each other as designed and or as specified herein without any substantial difficulty or interference. It does not mean they are necessarily wired together or bolted or otherwise physically connected. And it is hereby expressly not limited to wired or physically connected systems. It just means they are set up in a manner well known to those skilled in the art to work together as designed or specified herein. For example and not by way of limitation, the medium of connection may be wires, cables, or any of a combination of wireless media now known or later developed, and include transmission by any spectrum of energy such as radio, bluetooth, infrared, microwave, or the like, and whether now known or later developed. And the 'connection' can include any number of intervening devices or equipment intended to effect or manage or optimize the recited connection.

Machine and Transformation.

With respect to method claims appended it is expressly intended that each such claims sets forth either a transformation of data or an operable machine element or both. Any of the actions recited in the claims are to be regarded as being performed by the machine element corresponding to the practice in the art as understood by those skilled in the art, which practices are herewith incorporated by reference into this specification as if fully set forth herein. For example and not by way of limitation, the action of displaying is intended to include the implicit recitation of a machine display element on which to effect the action, which element is more or less specially designed to effect just that sort of action. In like manner storing is done with a (memory) storage device, and processing is down with a programmable hardware processor.

Invitations.

Invitations are discussed throughout this disclosure. In addition, and in response to an invitation, and before running downstairs to join, a user can send an anonymous RSVP to the invitation or to the existing gathering (with an optional timeout associated—30 minutes, for example—if the gathering is currently happening).

Turning now to the drawings, various embodiments of the disclosed system are described by reference to the numerals of the drawing figures wherein like numbers indicate like parts.

FIG. 1 is an overall system diagram of the disclosed system. User terminals 102, 104 and 106 are in two way communication via a distributed network with anonymous gathering server 120. User terminals 102, 104 and 106 may be any or all of several digital devices, either portable (smartphone, tablet) or relatively stationary (desktop, laptop). Server 120 may be a conventional server architecture part of a client/server system, or any substantially equivalent cloud computing structure now known or later developed. The distributed network may be any or all of the several conventional networks now in use or later developed, including but not limited to Internet, World Wide Web, wireless telephone data networks, WIFI or other wireless data networks.

Server 120 has a gathering engine 108 in communication with user database 110, community database 112, gathering database 114, advertiser database 116 and optional web server 118. Throughout this particular discussion of examples, any instance of a database, though perhaps differently numbered from one figure to the next, is either an instance of the same database or an instance of a database operatively associated with other like databases.

Gathering engine 108 includes one or more hardware processors for receiving and processing locational data from the user terminals, and for creating data associations between the various databases, and for creating and sending locational display data relative to gatherings of community members to web server 118. Server 118 sends electronic mapping data to the user terminals.

Figure 2A:
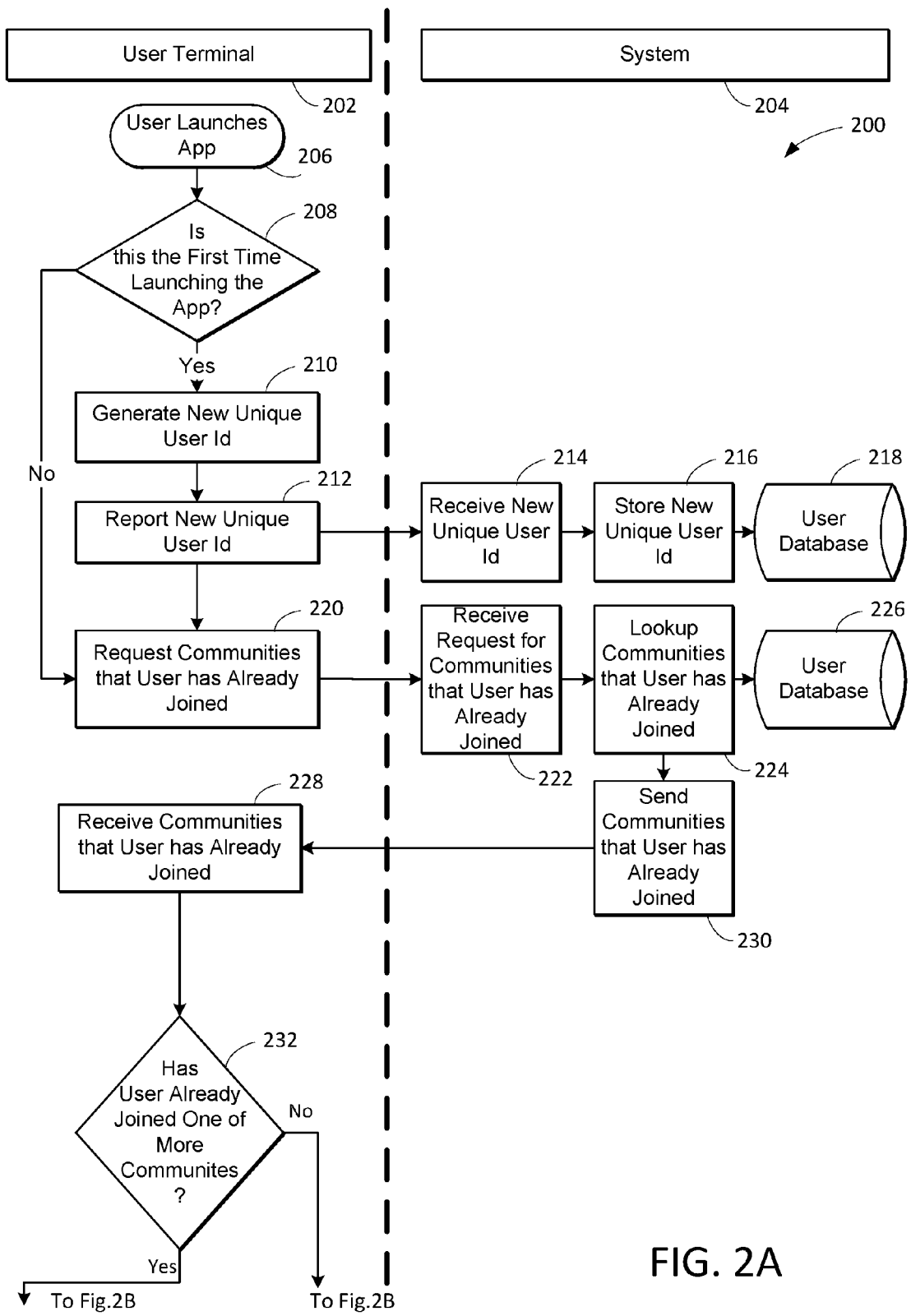
FIGS. 2a-2b are flowchart views of an aspect of the disclosure.
Figure 2B:
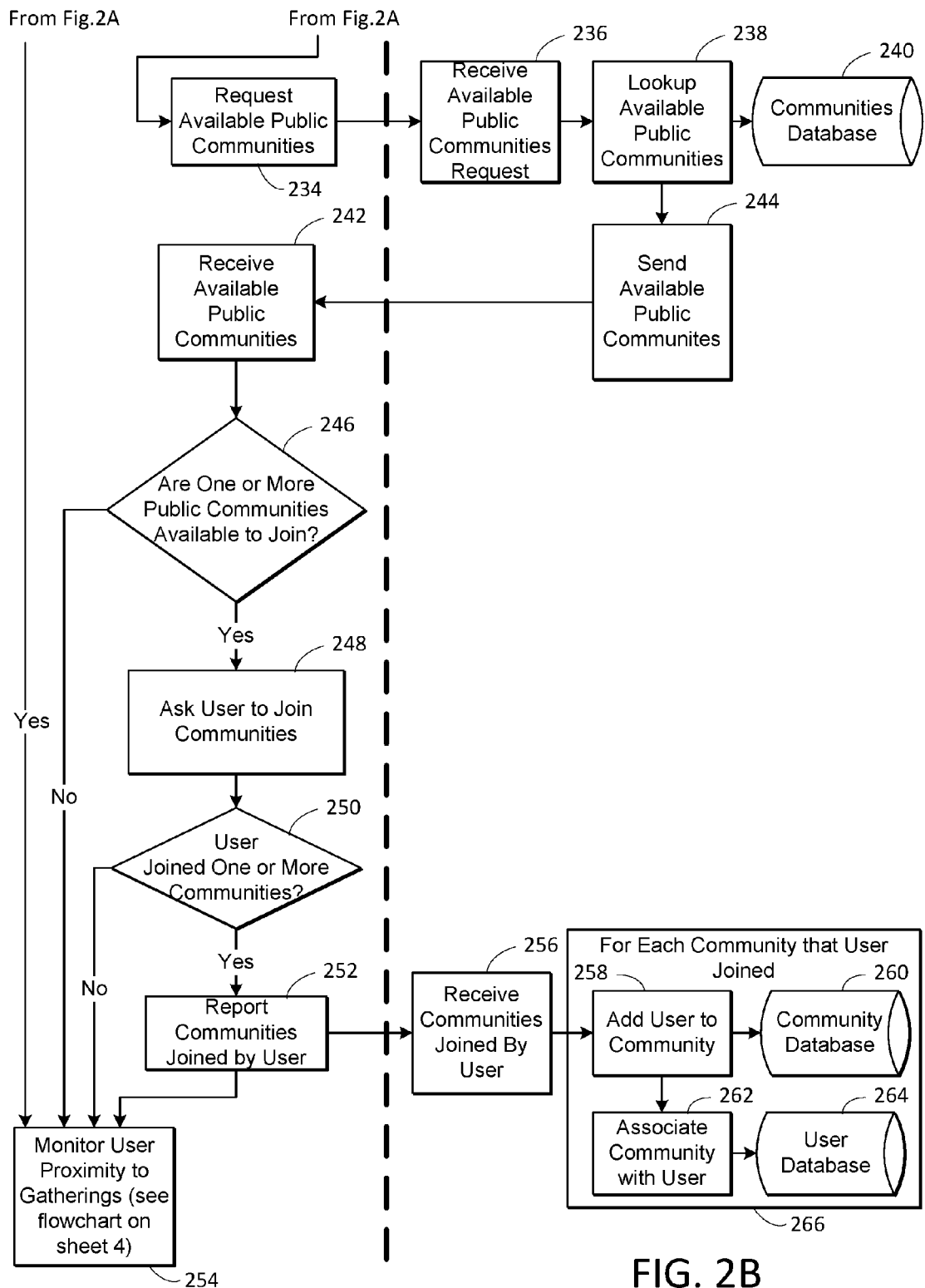

FIGS. 2*a* and 2*b* are flowchart representations of sample data flow in the disclosed system. Gathering engine programming 200 operates across a distributed network (dashed vertical line, not numbered) between user terminal 202 and back-end or cloud system 204. At 206 User launches the gathering app on user terminal 202 and at 208 the programming app queries whether this is a first time launch for User. If yes, then at 210 a new unique user ID is generated for User and reported to User at 212.

Across the network, the same new ID report is sent to the system at 214 where it is stored at 216 in user database 218. Note that this storage and database contain no other personal information about User, not name or address or interests, etc. Only the coded ID itself is stored. If the answer at 208 was no then at 220 a request for a listing of communities to which User already belongs is generated. This request is also generated at 220 in any ease, after a new User receives a unique ID. The request from 220 is sent across the network to the system at 222, which then prompts a community look-up at 224 from community database 226. There is a data association between user database 218 and community database 226 such that each user is associated with each community to which she has become a member, and each community is associated with each of its user members.

Figure 3A:
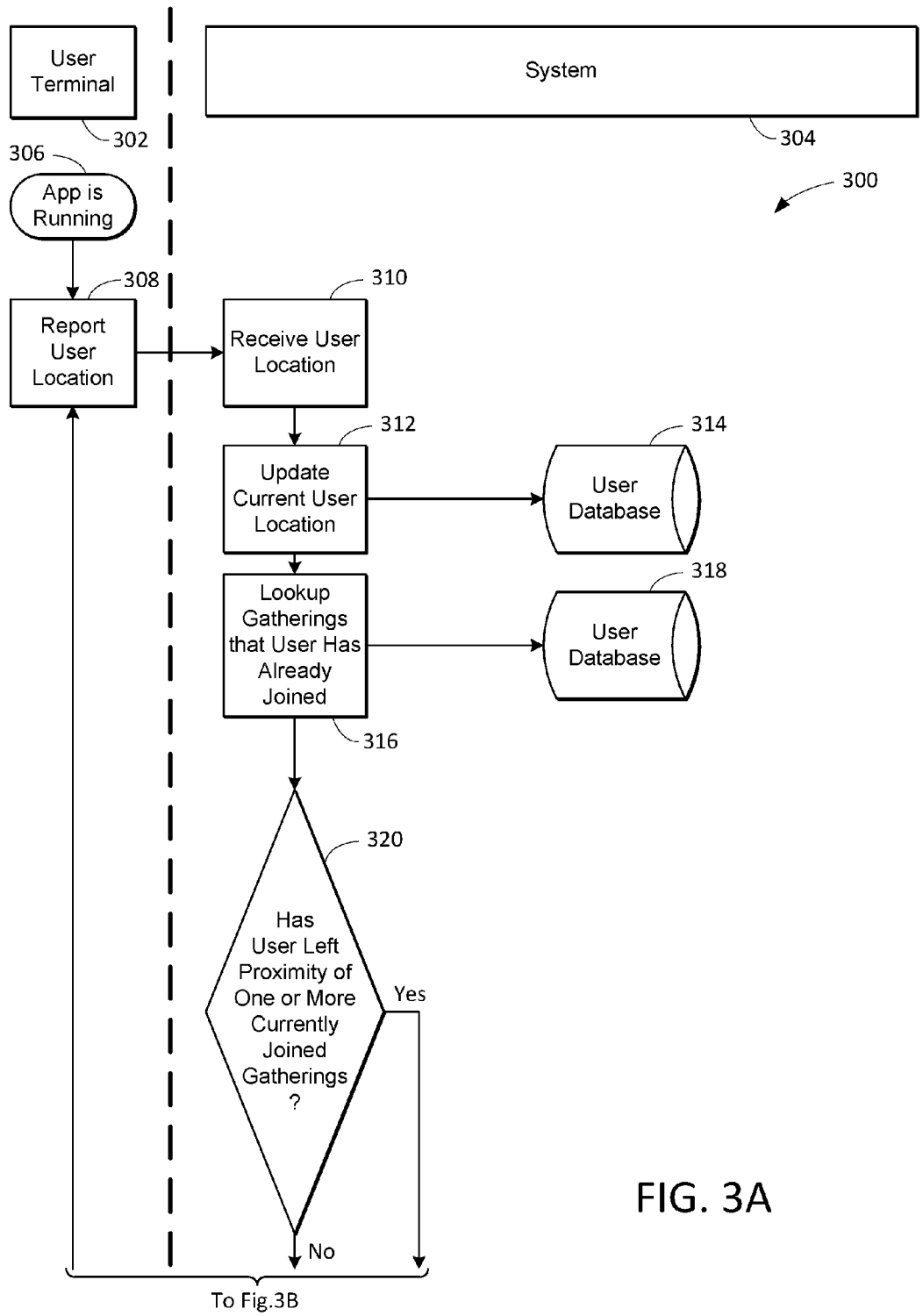
FIGS. 3a-3d are flowchart views of an aspect of the disclosure.
Figure 3B:
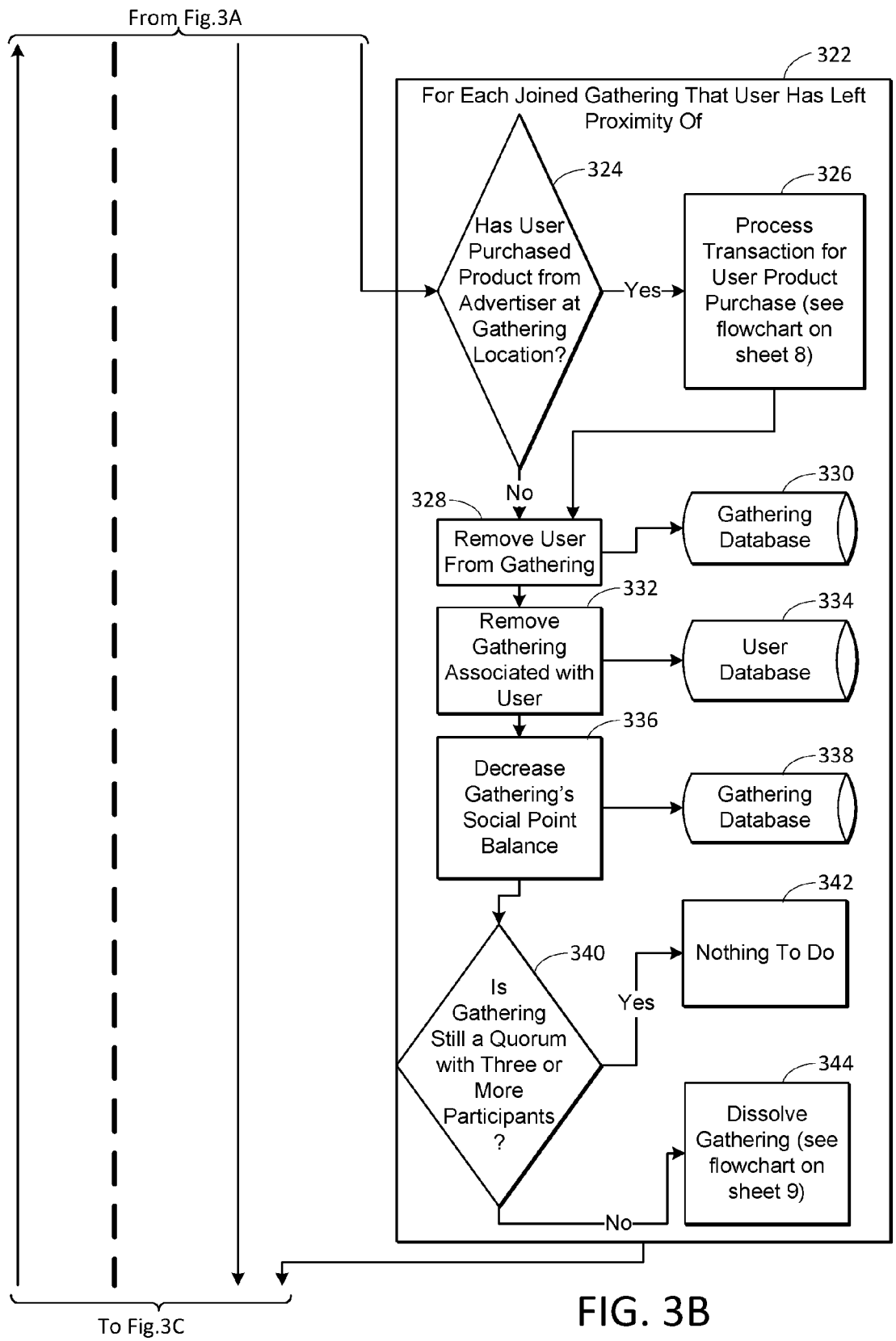
Figure 3C:
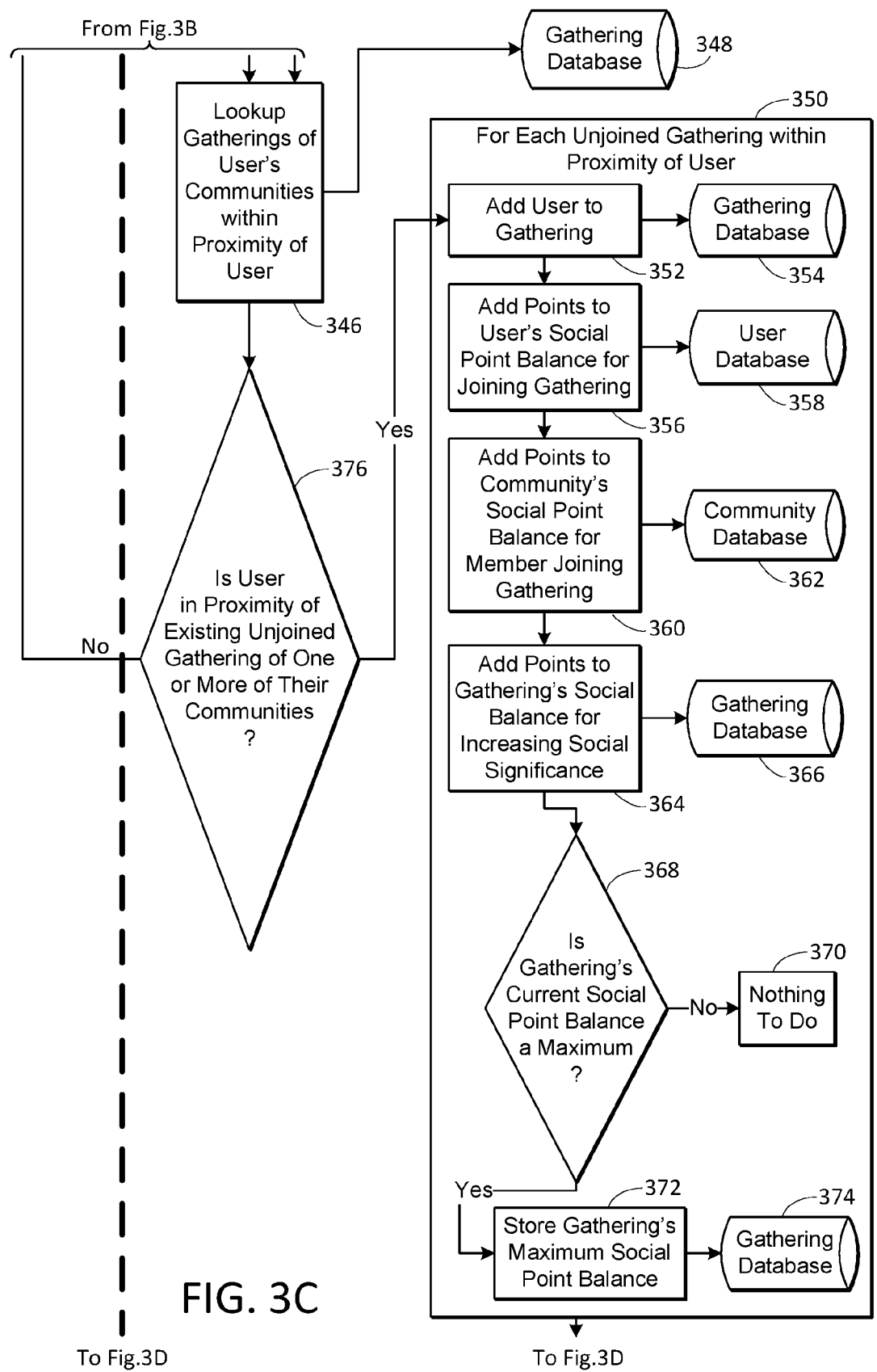
Figure 3D:
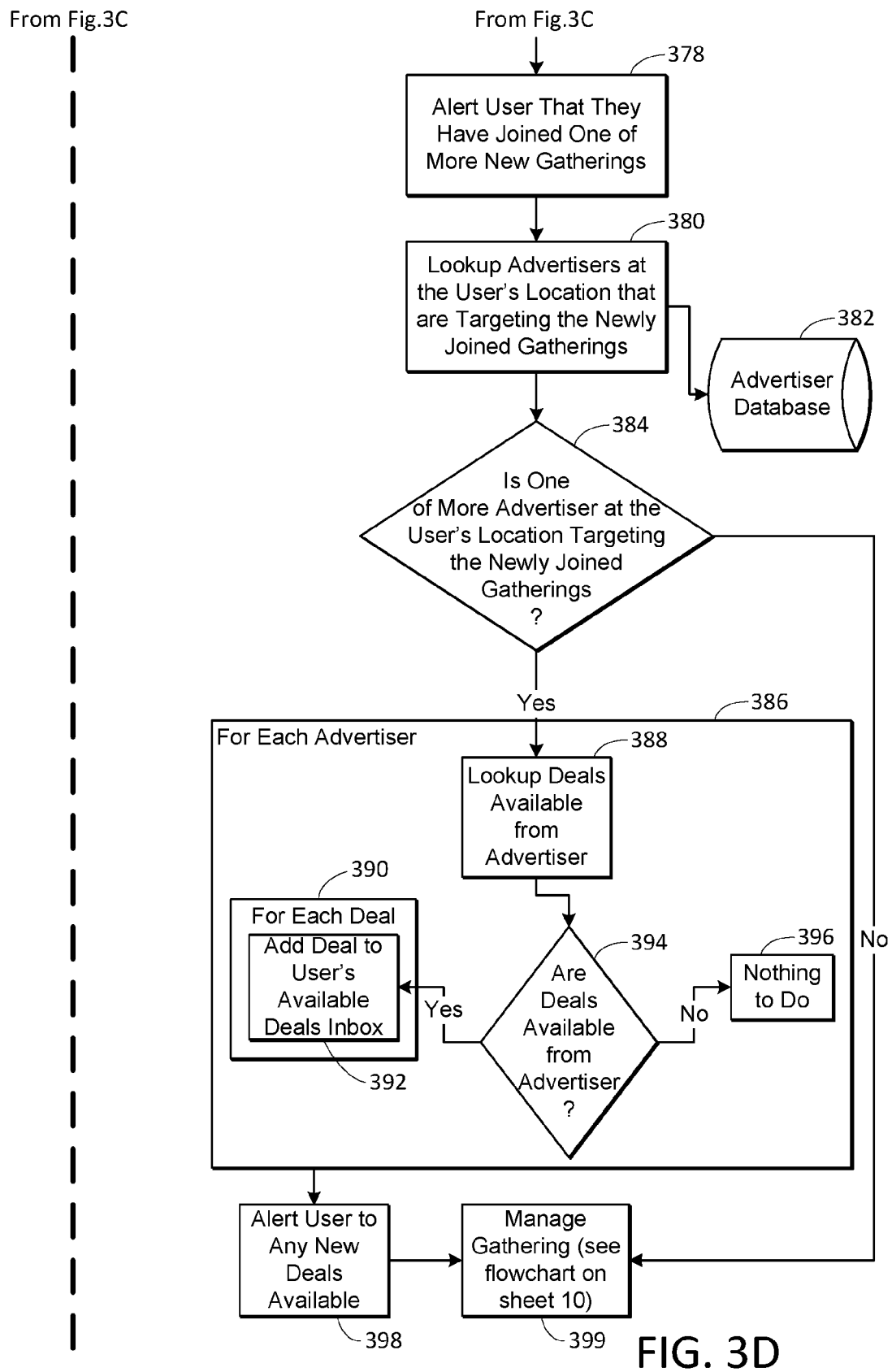

At 230 a listing of all communities which User has already joined is assembled and sent across the network to 228 in user terminal 202. There is a query at 232 as to whether this list is a null (user has yet to join any communities) or if the list contains at least one community already joined by User. If yes, at 254 user terminal 202 simply begins to monitor User proximity to gatherings (see flowchart FIG. 3*a*). If no (no communities joined yet), at 234 a list of available public communities to join is requested across the network to 236 in the system. A look-up of available public communities open for joining is conducted at 238 in communities database 240 which is operably connected to database 226 or a part of the same overall communities database. The look-up of available public communities is sent at 244 across the network to 242 on terminal 202. An essentially pro forma query is made at 246 to see if any of the public communities returned might not be available to join for some reason. If there are available communities to join, then User is asked to join one or more at 248. When User joins at least one community at 250, the communities joined are reported across the network at 256.

Next at data association engine 266 (desirably part of gathering engine 108), for each community that User has joined, User is added to the community 258 and the data association is stored in database 260, the community is associated with User at 262 and the data association is stored in database 264. Databases 260 and 264 are advantageously integral with respective previously discussed databases, or operatively associated with them.

If there are no communities to join at 246 or User declines to join any at 250, then flow passes by default to 254 where monitoring for User proximity to gatherings takes place even though there will be no gatherings available because of no communities joined. Alternatively, in the unlikely event of no communities available to join, or if User just waits to join, flow recycles at the query point 250 until User either joins or logs off or shuts down the app.

FIGS. 3*a*, 3*b*, 3*c* and 3*d* are flowchart representations of sample data flow in the disclosed system. Location monitoring engine programming 300 operates across a distributed network between user terminal 302 and back-end or cloud system 304. At 306 User is running the location monitoring app on user terminal 302. At 308 User location is determined and reported across the network to 310 and User location is updated at the system level at 312 and stored in database 314. The operation of location reporting is desirably deferred until the programming detects a nearby gathering of members of a community that User is also a member of, but the nature of the data flow illustrated is not changed. For instance, the flowchart reflects a point in time after a nearby gathering has been detected.

After updating location of User there is as look-up of gatherings that User is presently part of at 316 from database 318 (which as previously pointed out is either integral with all user database symbols in these figures or operatively associated with them. This will remain true through this particular discussion of the system). Then at 320 a further query is made as to whether User has left any of the gatherings she has previously joined. If the answer is yes, User has left a gathering, at 322 there is as gathering cheek-out process at the server end that is generally transparent to User.

At gathering check-out process 322, query 324 is made as to whether, while present at the gathering just departed, User purchased any product from an advertiser at the gathering location. If yes, then the transaction is processed 326 (see further detail in FIG. 4). Then (and also if the answer to query 324 is no) User is removed from the gathering 328 and the removal is recorded in gathering database 330. At the same time the gathering's association is removed 332 from User and the removal is recorded in user database 334. At 336 the departed gathering's social point balance is decreased, and the decrease is recorded in gathering database 338. Finally at 340 query is made to see if User's departure from the gathering has dropped the gathering population below quorum; if it has, at 344 the gathering is dissolved (see also FIG. 5).

Continuous query 376 is made to see whether User is in requisite proximity of any gatherings of any communities of which User is a member. When the answer is yes, and for every new yes (entering proximity of new gathering), gathering entrance process 350 (also generally transparent to User) is executed at the server. At 352 User is added to the gathering population and the addition is recorded at gathering database 354. At 356 points are added to User's social point balance for joining the gathering which is recorded in user database 358. At 360 points are added to the community's social point balance for User joining the gathering which is recorded in community database 362. At 364, 368 points are added to gathering's social point balance for User joining the gathering which is recorded in gathering database 358, unless a maximum balance has already been reached.

At 378 User is notified that she has joined a new gathering and at 380 there is a look-up of advertisers in advertiser database 382 for advertisers that are targeting that location for newly joined gatherings. At 384 if there is such an advertiser, then advertiser deal lookup process 386 is entered at the server. At 388 there is a deal look-up and if there is a deal 394, for each deal 390, the deal k added to User's deal inbox 392 and at 398 User is notified that there is a new deal available, and flowchart action proceeds at FIG. 6.

Figure 4:
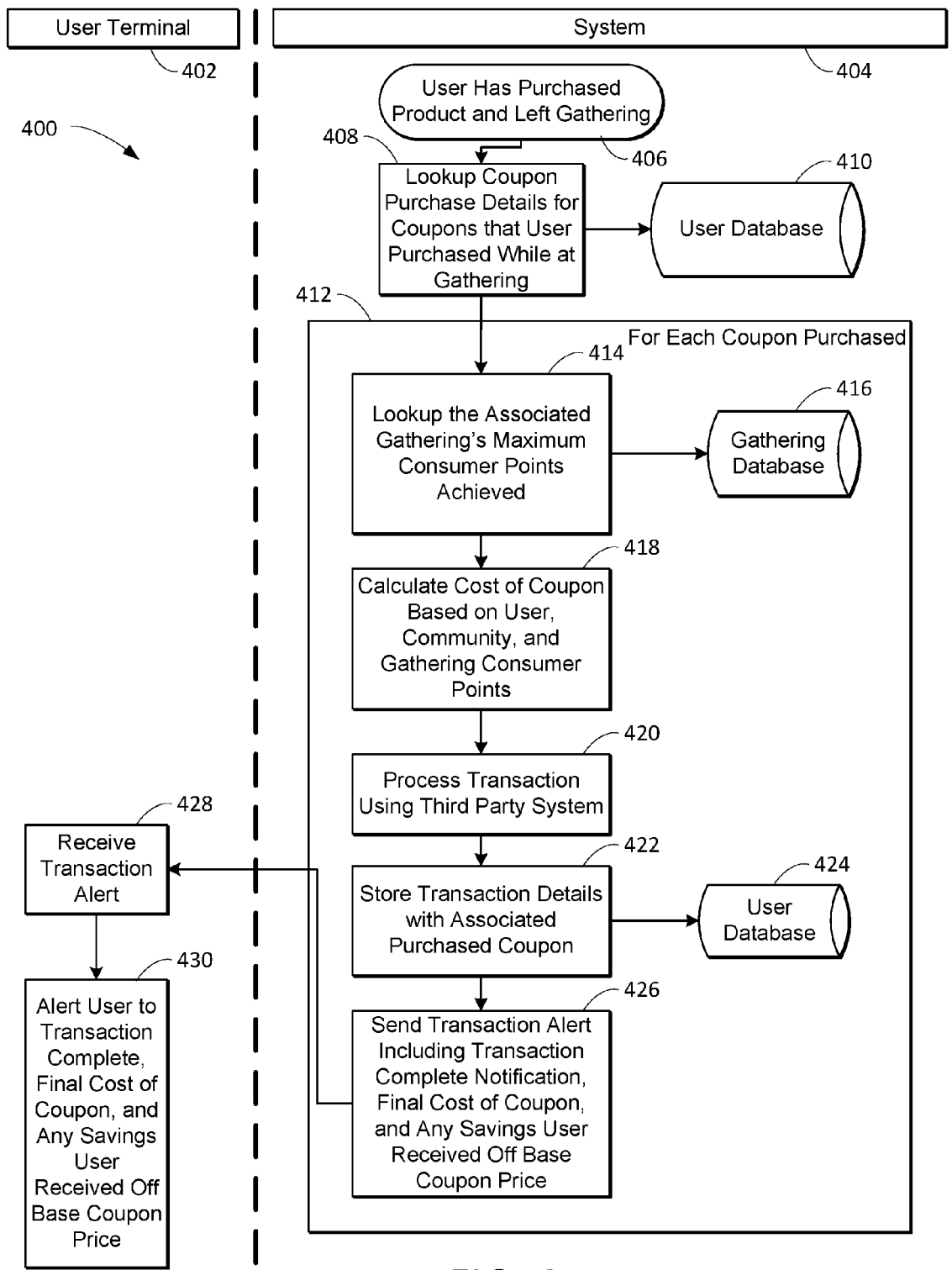
FIG. 4 is a flowchart view of an aspect of the disclosure.

FIG. 4 is a flowchart representation of sample data flow in the disclosed system. Commercial check-out engine programming 400 operates across a distributed network between user terminal 402 and back-end or cloud system 404. At 406 User has left a gathering and has purchased product while at the gathering. At 408 there is a look-up in user database 410 for coupon purchase details for coupons that User purchased at the gathering and coupon process 412 is entered. For each coupon purchased, at 414 there is a look-up in gathering database 416 of the associated gathering's maximum consumer points achieved, and at 418 cost of the coupon is calculated based on User, community and gathering consumer points as of the time User left the gathering. The commercial transaction is processed via third party system 420 and at 422 transaction details are stored with the associated purchased coupon in user database 424 and User is notified 426 of the transaction across the network at 428 including final cost of coupon and any savings User received off base cost of coupon 430.

Figure 5:
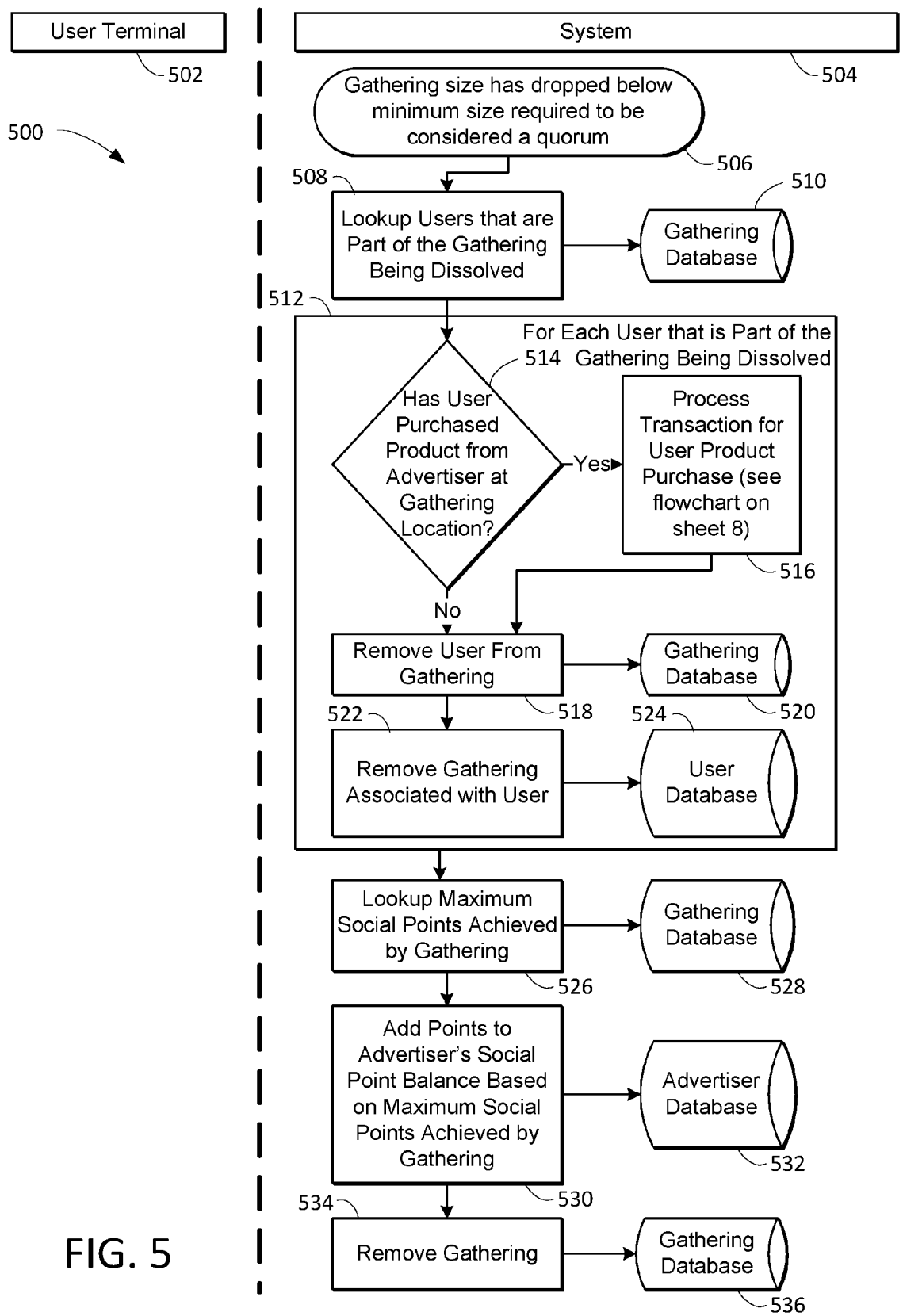
FIG. 5 is a flowchart view of an aspect of the disclosure

FIG. 5 is a flowchart representation of sample data flow in the disclosed system. Gathering dissolution engine programming 500 operates across a distributed network between user terminal 502 and back-end or cloud system 504. At 506 gathering size (population) has dropped below quorum and at 508 users remaining in the gathering are looked-up from gathering database 510. In gathering dissolution process 512, and for each user that is part of the gathering being dissolved, query 514 is made as to whether, while present at the gathering being dissolved, that user purchased any product from an advertiser at the gathering location. If yes, the transaction is processed 516 (see further detail in FIG. 4) and the user is removed from the gathering 518 and the removal is recorded in gathering database 520. At the same time, the gathering's association is removed 522 from the user and the removal is recorded in user database 524. At 526 the dissolved gathering's maximum social point balance achieved is looked-up, and the appropriate increase in advertiser's social point balance is added 530 in advertiser database 532. Finally at 534 the gathering is removed from gathering database 530.

Figure 6:
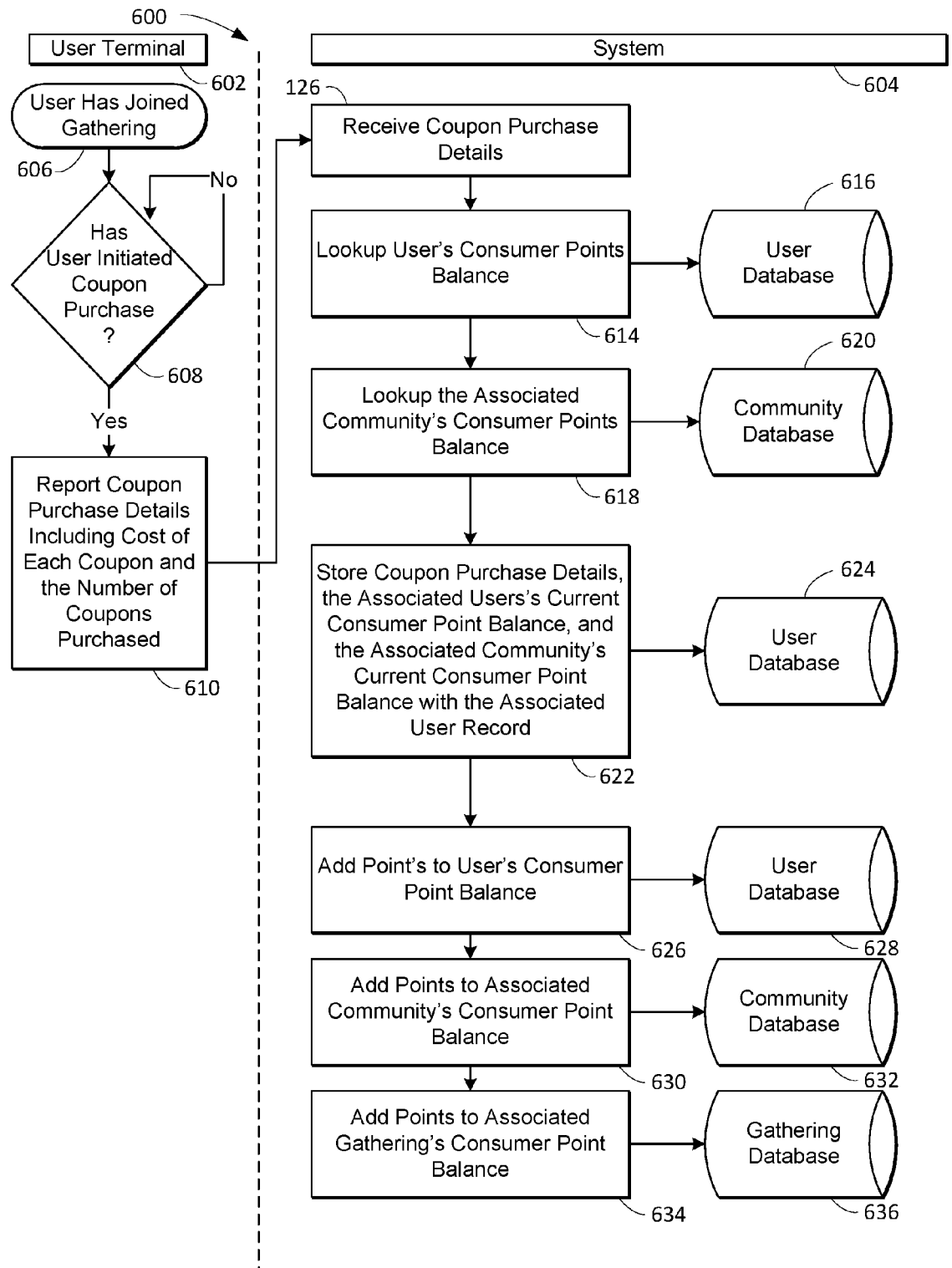
FIG. 6 is a flowchart view of an aspect of the disclosure.

FIG. 6 is a flowchart representation of sample data flow in the disclosed system. Coupon engine programming 600 operates across a distributed network between user terminal 602 and back-end or cloud system 604. At 606 User has joined a gathering and has started a coupon purchase 680 from an advertiser associated with the gathering just joined and a report 610 is sent across the network of the coupon purchase details including the cost of each coupon and the number of coupons purchased. At 612 coupon purchase details are received at the server and User's consumer points balance is looked-up 614 in user database 616. The gathering's community's associated consumer points balance is looked-up 618 in community database 620, and all of that data is stored 622 in user database 624 with User's associated record. Points are added 626 to User's consumer point balance and also to respective community 630 and gathering 634 point balances and stored in respective user 628, community 632 and gathering 636 databases.

Figure 7:
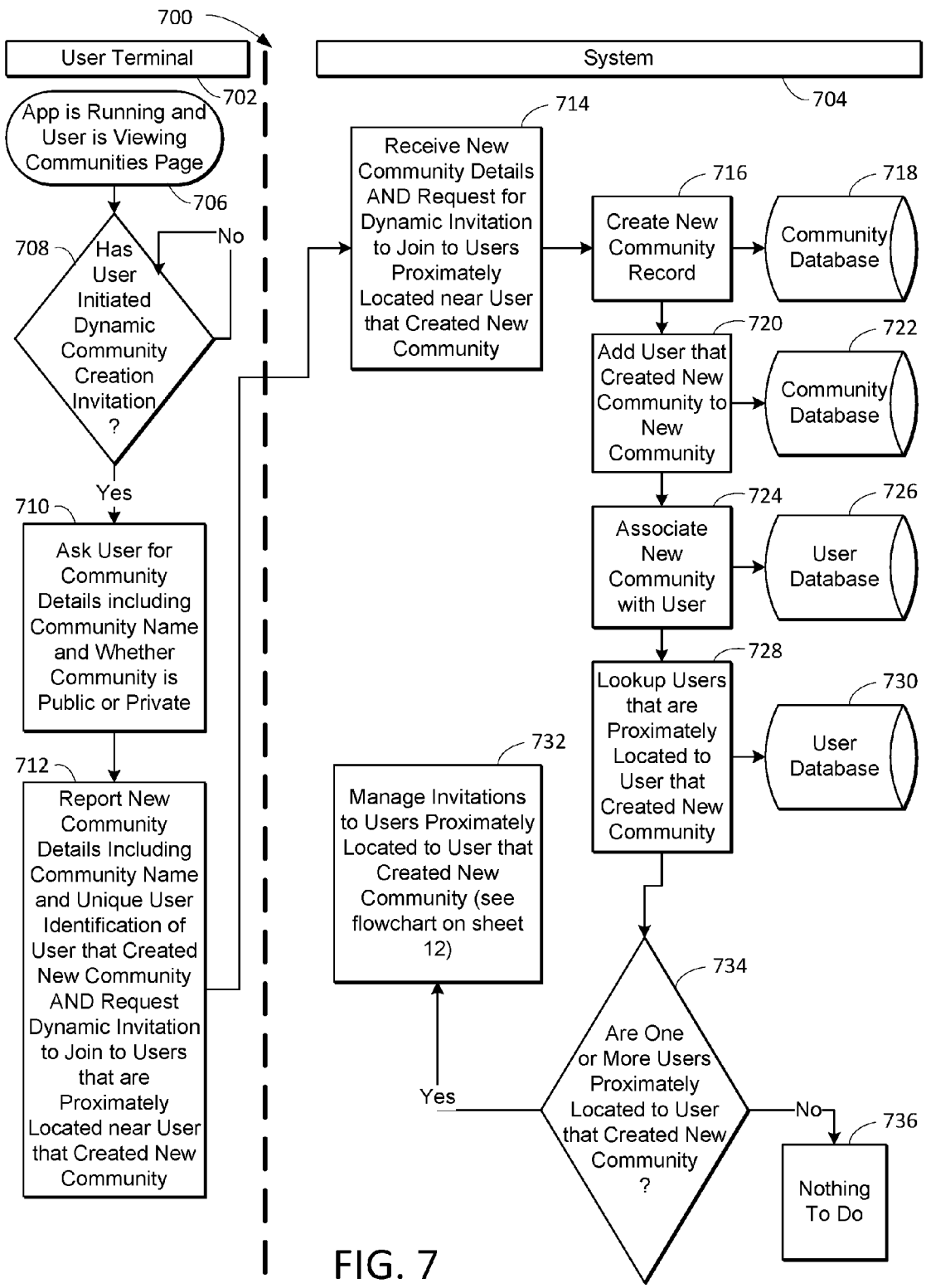
FIG. 7 is a flowchart view of an aspect of the disclosure.

FIG. 7 is a flowchart representation of sample data flow in the disclosed system. Dynamic community creation programming 700 operates across a distributed network between user terminal 702 and back-end or cloud system 704. At 706 the system app is running and User is viewing the communities web page. At 708 there is a query to see if User has started a dynamic community creation invitation. If she has, User is queried 710 for new community name and whether it is to be public or private, and these details, including user ID of User creating new community are reported across the network to the server at 714 along with s request for a dynamic invitation for users to join who are proximate User for the newly created community. New community record is created 716, User is added to the community 720, the new community is associated with User 724 and users proximate User's location upon forming the new community are looked-up 728, and all is stored in respective databases 718, 722, 726 and 730. If there are any users proximate User at time of new community creation, invitations to them to join are managed at 732 (see also FIG. 8).

Figure 8:
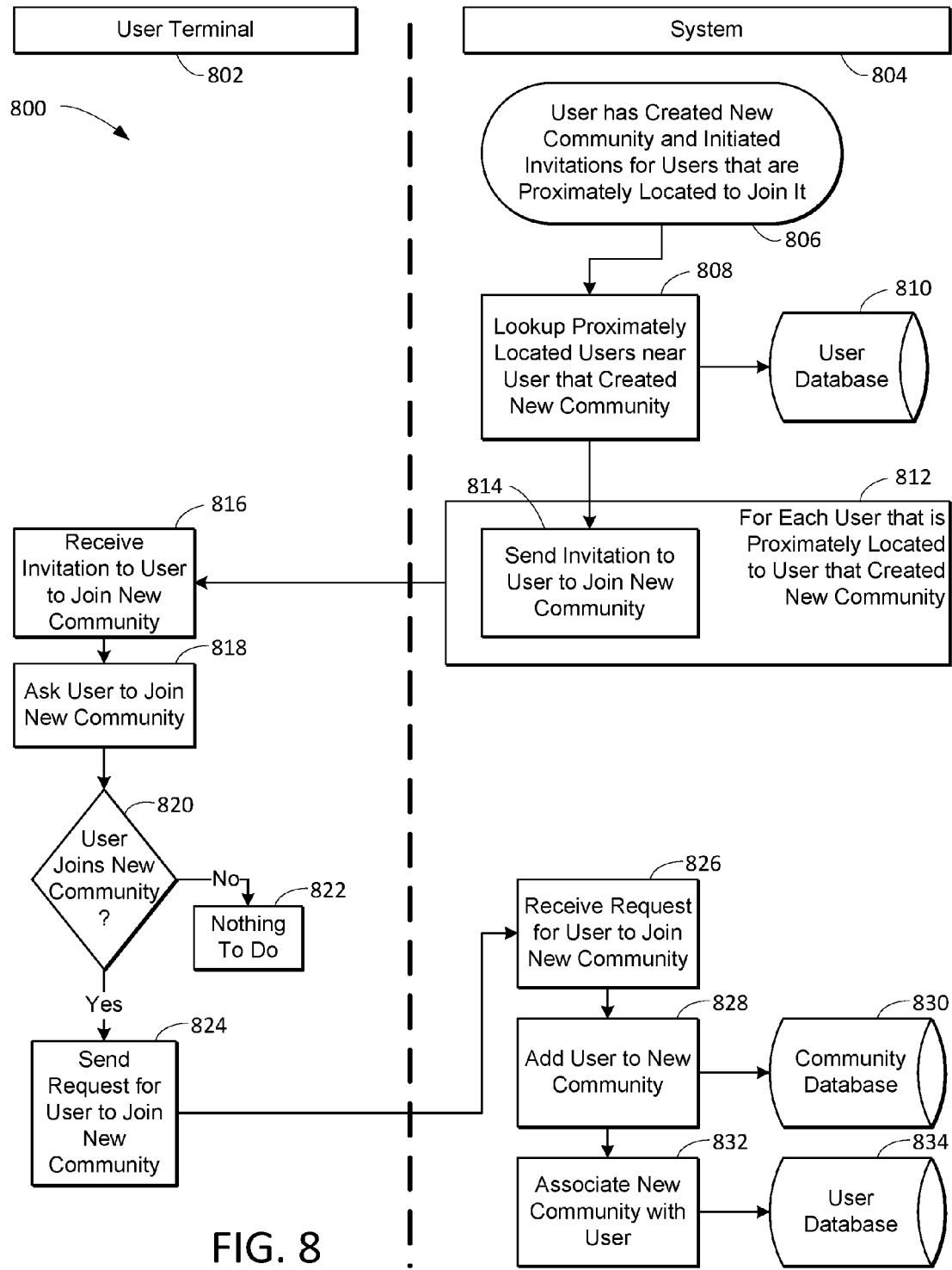
FIG. 8 is a flowchart view of an aspect of the disclosure

FIG. 8 is a flowchart representation of sample data flow in the disclosed system. New users for new dynamic community creation programming 800 operates across a distributed network between user terminal 802 and back-end or cloud system 804. At 812 and for each such proximate user an invitation to join 814 is sent across the network to 816 for the user to join the new community 818. If the user accepts and joins at 820, as request for new user joining community is sent across the network to 826 and the user is added 828 to the new community and the new community is associated with the user 830, and all is stored in respective databases 830 and 834.

Figure 9:
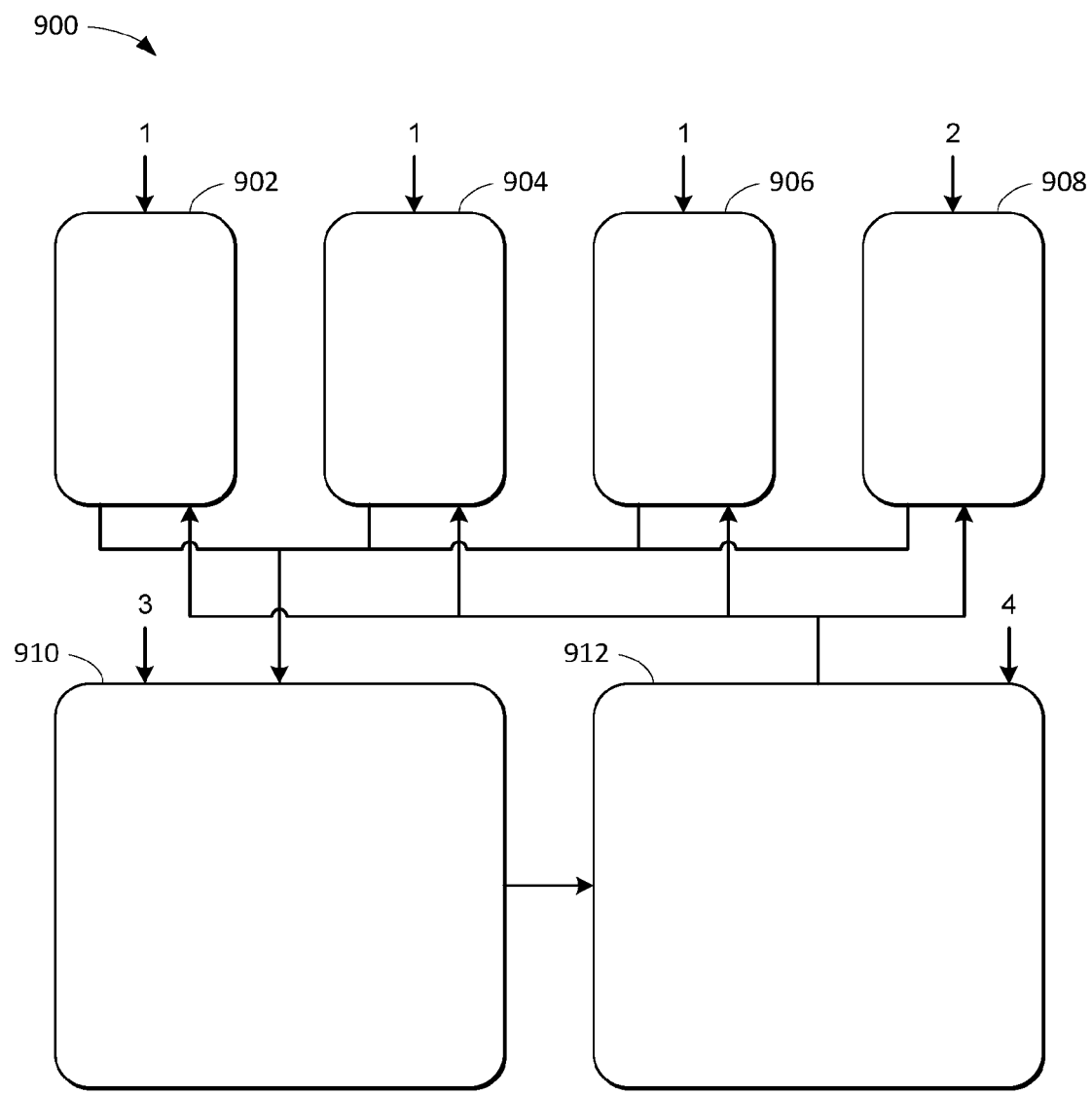
FIG. 9 is a diagram of an implementation architecture of the disclosed system.

FIG. 9 shows a system architecture view of the disclosed system. Portable geolocating devices 1 with disclosed application loaded, along with web browser on non-geolocating device 2, are linked via distributed network to server 3 which processes location information from devices 1 and device 2 to determine the existence of as quorum, manages gathering invitations, processes and stores historical community gathering information, and generates the community gathering electronic mapping. The community gathering electronic mapping is then sent via web server 4 to portable geolocating devices 1 and to web browser on non-geolocating device 2.

Other Gathering Indicator Information.

Intensity. Intensity of the gathering is measured in part by the size and increase or decrease in size of the gathering over time. For instance, an increase from a size of 3 to 5 in two minutes is more intense than an increase from 3 to 5 in two hours; a fifty person gathering is more intense than five person gathering.

Invitation indicator information. Invitation indicator information desirably also includes invitation identification, community association, gathering logistics information (i.e., the invite—when, what to bring, where in the bar to meet, etc.), optional link to community page with gathering archive where there can be photos, videos, comments, etc. from past gatherings.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance Milt the doctrine of equivalents.

We claim:

1. A method for facilitating social gatherings for a common-interest community of portable device users, the method comprising:

receiving, by a computing device over a wide area network, information associating each of a plurality of portable digital devices to one or more common-interest communities;

storing in a tangible computer-readable storage medium the information associating each of the plurality of portable digital devices to the one or more common-interest communities;

tracking by a computing device through a wide area network, the variable geographic location of selected ones of the plurality of portable digital devices;

determining, by a computing device, that a preselected number of portable digital devices which are each associated to a selected community have entered within a first preselected proximity to each other; and after the preselected number of portable digital devices which are each associated to the selected community have entered within the first preselected proximity to each other, sending, by a computing device, information configured to create a display of a geographic location for the selectedly proximate digital devices to at least one other portable digital device which is associated with the selected community and which is within a second preselected proximity to the preselected number of portable devices.

2. The method of claim 1 wherein the display is selected from the group of displays consisting of a map with geographic icons and a textual list of geographic locations.

3. A method for locating a social gathering of a common-interest community, the method comprising:
   .sending, by a first portable digital device, information configured to register the first portable digital device with a service for facilitating social gatherings;
   sending, by the first portable digital device, information configured to select one or more communities of interest;
   sending, by the first portable digital device, signal usable to determine the geographic location of the first portable digital device; and
   receiving, by the first portable digital device, information configured to create a display of a geographic location for a plurality of other portable digital devices,
      each of the other plurality of other portable digital devices being associated with at least a one of the selected communities, and
      each of the other plurality of other portable digital devices having variable geographic location and having entered into a first selected proximity to each other,
      after the plurality of other portable digital devices is within a second selected proximity to the first portable digital device.

4. The method of claim 3 wherein the display is selected from the group of displays consisting of a map with geographic icons and a textual list of geographic locations.

5. A system for facilitating social gatherings for a common-interest community of portable device users, the system comprising:
   a wide area network;
   a network interface;
   a tangible computer-accessible storage medium;
   a processor coupled to the network interface and the storage medium;
   a set of instructions stored in the storage medium, which, when executed by the processor cause the processor to:
      receive information associating each of a plurality of portable devices to one or more common-interest communities;
      store, in the storage medium, the information associating each of the plurality of portable digital devices to the one or more common-interest communities;
      track the variable geographic location of selected ones of the plurality of portable digital devices;
      determine that a preselected number of portable digital devices which are each associated to a selected community have entered within a first preselected proximity to each other; and
      after the preselected number of portable devices which are each associated to the selected community have entered within the first preselected proximity to each other, send information configured to create a display of a geographic location for the selectedly proximate portable digital devices to at least one other portable digital device which is associated with the selected community and which is within a second preselected proximity to the preselected number of portable digital devices.

6. The system of claim 5 wherein the display is selected from the group of displays consisting of a map with geographic icons and a textual list of geographic locations.

7. The system of claim 5 wherein the set of instructions when executed by the processor further cause the processor to send over the wide area network information configured to create a display indicative of rewards, the rewards being determined by a second selected number of portable digital devices selectedly proximate within a geographic location.

* * * * *